United States Patent [19]

Uozumi et al.

[11] 4,018,106
[45] Apr. 19, 1977

[54] POWER TRANSMISSION SYSTEM

[75] Inventors: Sumio Uozumi; Fmihiro Ushijima, both of Toyota, Japan

[73] Assignee: Toyota Jidosha Kogyo Kabushiki Kaisha, Japan

[22] Filed: Feb. 6, 1975

[21] Appl. No.: 547,497

[30] Foreign Application Priority Data

Aug. 19, 1974   Japan ............................... 49-94319

[52] U.S. Cl. ................................................ 74/688
[51] Int. Cl.² ......................................... F16H 3/44
[58] Field of Search ................... 74/677, 687, 730; 192/3.3, 3.33

[56] References Cited

UNITED STATES PATENTS

| | | | |
|---|---|---|---|
| 2,402,164 | 6/1946 | Kelbel | 74/677 |
| 2,716,906 | 9/1955 | Seybold | 74/677 |
| 2,969,694 | 1/1961 | Harmon et al. | 74/677 |
| 3,009,368 | 11/1961 | DeLorean | 74/677 |
| 3,261,232 | 7/1966 | Ahlen | 74/677 X |

FOREIGN PATENTS OR APPLICATIONS

| | | | |
|---|---|---|---|
| 631,677 | 11/1961 | Canada | 74/730 |
| 1,201,647 | 3/1957 | Germany | 74/677 |

Primary Examiner—Samuel Scott
Assistant Examiner—Wesley S. Ratliff, Jr.
Attorney, Agent, or Firm—Toren, McGeady and Stanger

[57] ABSTRACT

In an automotive power transmission system wherein the engine output shaft is connected to the input shaft of the speed change gear unit through a fluid torque converter, an intermediate shaft, chain wheels and a chain drive, in that order, with a direct drive clutch and an overdrive unit being provided between the engine power shaft and the intermediate shaft or the chain wheels, drive may be transmitted directly to the speed change gear unit during high speed operation in a manner which bypasses the fluid torque converter with or without overdrive.

5 Claims, 4 Drawing Figures

POWER TRANSMISSION SYSTEM

BACKGROUND OF THE INVENTION

The present invention relates generally to a power transmission system for automotive and other vehicles and more particularly to a system wherein the speed change gear unit provided with a fluid torque converter is combined with an overdrive system.

In fluid transmission systems heretofore used for automotive vehicles, a fluid transmission system in the form of a fluid coupling or torque converter has been used to perform the functions of a clutch whereby the necessity for a clutch pedal is obviated due to the slippage occurring in the fluid transmission system which smoothly varies the resistances generated by a load. Such a fluid transmission system, however, gives rise to certain disadvantages in that fuel cost is increased due to inherent slippage and fluid losses. Thus, there arises the need for improvements in such systems whereby greater efficiency may be obtained with lowered fuel consumption. Such improvements are particularly beneficial in view of recent petroleum shortages.

Automatic transmission systems are also known wherein an overdrive system is combined with the transmission system to permit reduction in the number of engine revolutions thereby reducing fuel consumption. In such known devices, an overdrive unit is mounted at the output side of the transmission system and, as a result, the overdrive gearing must necessarily be enlarged in size in order to meet resulting torque increases and reversed rotation of the output shaft during backing of the vehicle.

The present invention contemplates provision of a power transmission system in which an overdrive unit is mounted at the input side of the speed change gear unit in such a way that the engine may be directly connected with the speed change gear unit in order to bypass the fluid transmission system, the engine being at this time connected to the gear unit by means of the overdrive unit in accordance with desired drive conditions.

SUMMARY OF THE INVENTION

Briefly, the present invention may be described as a power transmission system wherein an engine power shaft is connected to the impeller of a fluid transmission system, with the turbine of the fluid transmission system being connected through a one-way clutch device to an input shaft of a speed change gear unit, an overdrive unit being provided with a frictional coupling device mounted intermediate the engine power shaft and the input shaft of the speed change gear unit. The overdrive unit is located adjacent the engine drive member and includes associated mechanism whereby the fluid transmission system may be bypassed and power may be transmitted directly from the engine drive member to the speed change gear unit of the system.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DESCRIPTION OF THE PREFERRED EMBODIMENTS

Figure 1:
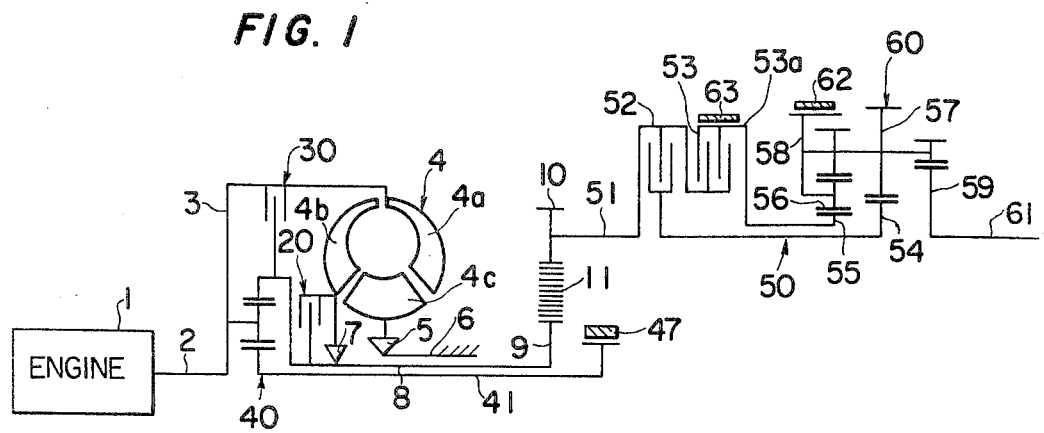
FIG. 1 is a schematic diagram showing an arrangement in accordance with a first embodiment of the present invention.
Figure 2:
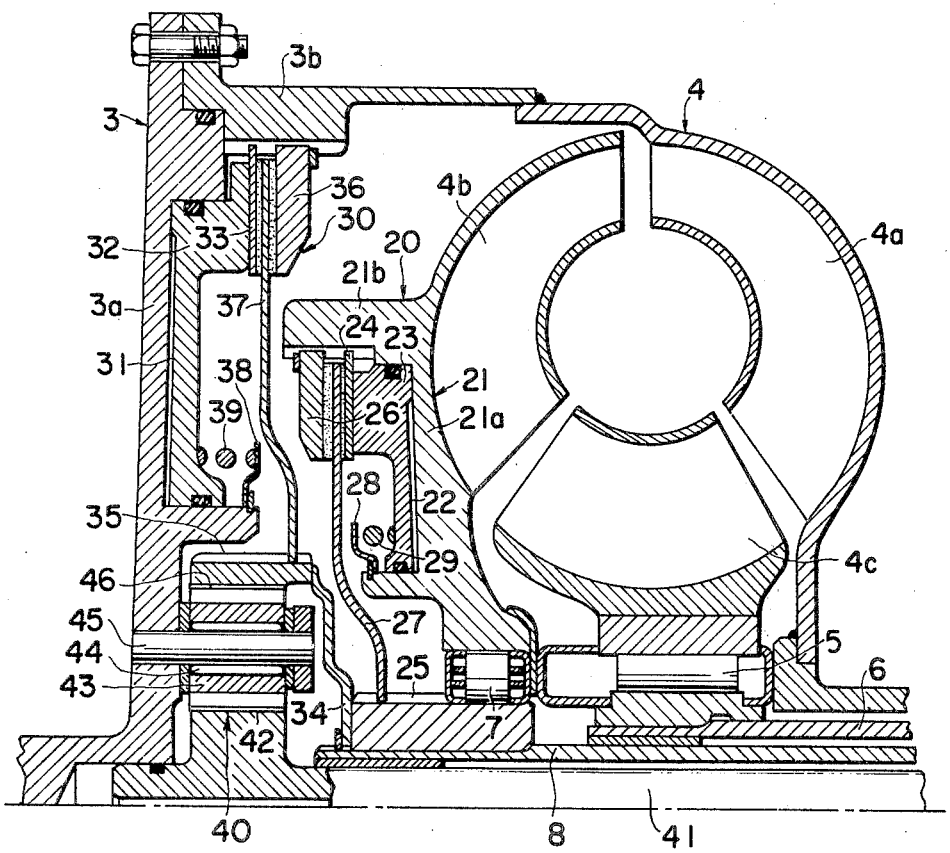
FIG. 2 is a sectional view showing some of the structural elements of the device of FIG. 1 formed in accordance with the present invention.

Referring now to the drawings, wherein like reference numerals refer to similar parts throughout the various figures thereof, the first embodiment of the present invention shown in FIGS. 1 and 2 is used with a speed change gear unit combined with a fluid torque converter. A power shaft 2 of an engine 1 is connected to an impeller 4a of a torque converter 4 by means of a drive member 3. The torque converter 4 is of the fluid operated three-element, one-stage, two-phase type and is so constructed and arranged that the motive power developed by the impeller 4a is transmitted to a turbine 4b of the torque converter 4 under the effects of circulating eddy currents of the working fluid, with the stator 4c being connected by way of a one-way clutch device 5 to a stator shaft 6 secured to a casing (not shown) for regulating flow of the working fluid in a manner known to those skilled in the art.

The invention provides an intermediate shaft 8 which is connected to the turbine 4b by way of a clutch device 20 and a one-way clutch device 7. Between the drive member 3 and the intermediate shaft 8 there are provided a further clutch device 30 and an overdrive unit 40. The intermediate shaft 8 is connected through chain wheels 9, 10 and a chain 11 for transmission of motive power to an input shaft 51 of a speed change gear unit 50.

The clutch devices 20 and 30, and the overdrive unit 40 are shown in more detail in FIG. 2. The clutch device 20 comprises a drum 21 formed integrally with the turbine 4b of the torque converter 4. A piston 23 is provided in a support portion 21a of the drum 21. The drum 21 is configured to define a piston or pressure chamber 22 which operates to actuate the piston 23 by means of hydraulic pressure supplied in the chamber 22. A clutch plate 24 is splinedly engaged with a portion 21b of the drum 21 on a side of the piston 23 opposite the pressure chamber 22. A clutch disc 27 is splinedly engaged intermediate the plate 24 and a pressure plate 26. The disc 27 extends from its engagement between the plate 24 and the plate 26 to engagement with a hub member 25 which is integrally mounted to the intermediate shaft 8. A return spring 29 is mounted between the piston 23 and a seat member 28 which is affixed to the support portion 21a of the drum 21. The spring 29 operates against the force of hydraulic pressure in the chamber 22 which is applied to the piston 23. Accordingly, the piston 23 may be moved under the hydraulic pressure in the chamber 22 against the force of the spring 29 for frictionally coupling the plate 26 with the disc 27 and thereby coupling the turbine 4b with the shaft 8.

The one-way clutch device 7 provided between the turbine 4b and the shaft 8 is actually physically mounted between the hub member 25 and the drum 21 and it is formed integrally with the turbine 4b so that it may be brought into engagement with the shaft 8 by engagement of the one-way clutch device 7. The one-way clutch 7 disengages in a known manner when the speed of rotation of the shaft 8 exceeds rotation of the turbine 4b.

The clutch device 30 is comprised of a piston 32 provided within a support portion 3a of the drive member 3 with the piston 32 being arranged for actuation by hydraulic pressure in a piston or pressure chamber 31 defined by a portion of the drive member 3. A clutch plate 33 is splinedly engaged with a portion 3b of the drive member 3. A clutch disc 37 is splinedly engaged intermediate the plate 33 and a pressure plate 36 and the disc 37 extends from this intermediate engagement into engagement with a hub member 35 which is fixed to the shaft 8 by a connecting member 34. A return spring 39 is mounted between the piston 32 and a seat member 38. The spring 39 operates against the piston 32 to apply a force opposing the force of hydraulic fluid pressure in the chamber 31. Thus, when hydraulic pressure is applied in the chamber 31 the piston may be advanced thereby against the force of the spring 39 for frictionally coupling the plate 33 with the disc 37 and thereby to couple the drive member 3 with the shaft 8.

The overdrive unit 40 comprises a sun gear 42 formed with a reaction shaft 41 mounted with shaft 8. Pinions 43 are rotatably mounted by means of a needle roller bearing 44 upon pins 45 which are affixed to the drive member 3. The pinions 43 are arranged in intermeshing engagement with the sun gear 42 and a ring gear 46 formed on the hub member 35 is adapted to mesh with the pinions 43. A braking band 47 is provided for locking the reaction shaft 41 against rotation. When the reaction shaft 41, and consequently the sun gear 42, is locked against rotation by the braking band 47, drive is transmitted from the drive member 3 to the shaft 8 through the pins 45, the pinions 43 and the ring gear 46 thereby producing an overdrive output having an overdrive gear ratio on the order of 0.7.

The input shaft 51 of the speed change gear unit 50 is connected to the output shaft 61 by way of two sets of clutch devices 52,53 and a planetary gearing system 60 which comprises sun gears 54,55, pinions 56,57, a carrier 58 and a gear 59. The carrier 58 is fitted with a braking band 62, and a clutch drum 53a of the clutch device 53 is fitted with a further braking band 63. A first speed with a high gear ratio is attained by engaging the clutch device 52 to transmit the motive power from the input shaft 51 to the sun gear 54 and by locking the carrier 58 by means of the braking band 62.

A second speed ratio lower than the first speed ratio is attained by engaging the clutch device 52 and by locking the sun gear 55 by means of the braking band 63.

A direct drive or third speed is attained by engaging the clutch device 53 and the clutch device 52 to transmit motive power from the input shaft 51 to both the sun gears 54,55 so as to directly connect the input shaft 51 with the output shaft 61.

Finally, a reverse speed is attained by reversing the rotation of the output shaft 61 by operation of the clutch device 53 and braking band 62.

Thus, when the vehicle is operating with normal speed and with both the clutch device 30 and the braking band 47 rendered inoperative, drive from the engine power shaft 2 is transmitted through the drive member 3 to the impeller 4a of the torque converter 4 and thence to the input shaft 51 of the speed change gear unit 50 through the turbine 4b, one-way clutch device 7, shaft 8, chain wheel 9, chain 11 and chain wheel 10, in the order set forth. The transmission system which is developed at this time is similar in its function to a customary automatic transmission system with three forward speeds and a reverse speed being attained at the output shaft 61 by operation of the two clutch devices 52,53 and the two braking bands 62,63 as desired at the speed change gear unit 50.

In the case of drive from the output shaft 61, the one-way clutch device 7 is disengaged by the inherent construction and thereby prevents engine braking. At such time, the turbine 4b of the torque converter 4 is connected with the shaft 8 by engagement of the clutch device 20. Drive is now effected from the output shaft 61 to the engine 1 to permit engine braking.

When the drive member 3 is connected with the shaft 8 by engagement of the clutch device 30, drive is established from the engine 1 directly to the gear unit 50 through the shaft 8 so as to bypass the converter 4. Thus, the engine 1 and the gear unit 40 are connected directly with the speed change gear unit 50 without utilizing the liquid medium as would occur in the case of manual transmission.

When the vehicle is operating in third speed and the sun gear 42 is locked by application of the braking band 47, an overdrive output is delivered at the shaft 8 by operation of the overdrive unit 40. The one-way clutch device 7 disengages at this time due to the high rotational speed of the shaft 8 so that drive is no longer transmitted through the torque converter 4 and the shaft 8 is connected directly with the engine 1. The high-speed rotation of the shaft 8 is transmitted to the output shaft 61 through the chain wheels 9 and 10 and the chain 11, the input shaft 51 and the planetary gear unit 60, thereby attaining an overdrive speed.

Figure 3:
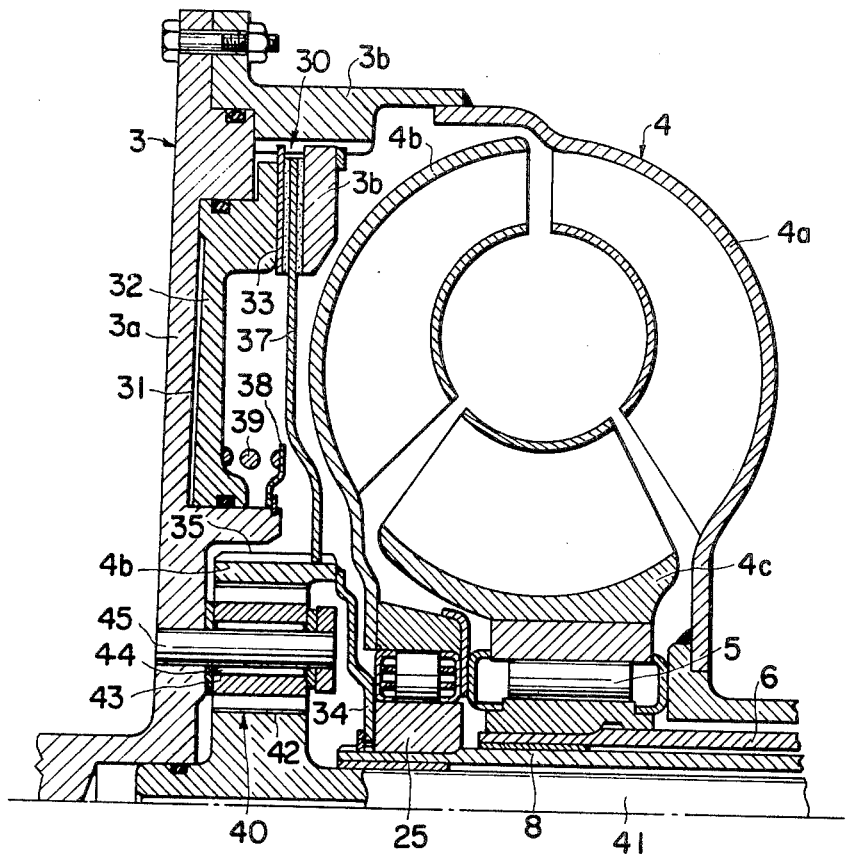
FIG. 3 is a sectional view showing the structural elements of a second embodiment of the present invention.

FIG. 3 depicts a second embodiment of the invention wherein the clutch device 20 of the previously described first embodiment is omitted in order to minimize the size of the overall transmission system. In this embodiment, the clutch 30 for direct drive may be employed to effect engine braking.

Figure 4:
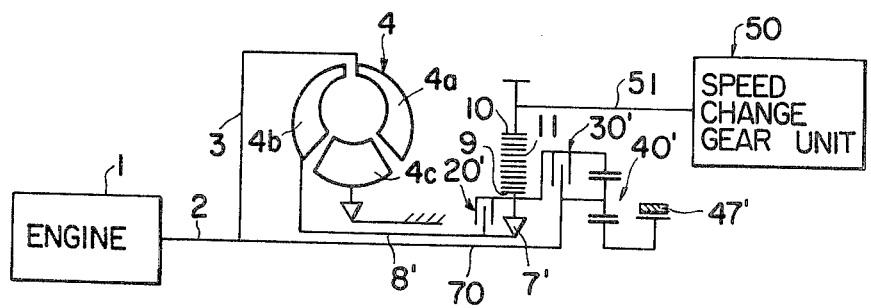
FIG. 4 is a schematic diagram showing an arrangement in accordance with a third embodiment of the present invention.

FIG. 4 depicts a third embodiment of the invention wherein an intermediate shaft 8' designed to be coupled with the turbine 4b of the torque converter 4 is connected with the chain wheel 9 through the one-way clutch device 7' and a further clutch device 20' for engine braking. In addition, an overdrive unit 40' provided with a clutch device 30' for direct drive and a braking band 47' are mounted intermediate a chain wheel 9 and a shaft 70 coupled with the engine power shaft 2. The operation of the third embodiment is essentially the same as that of the previously described embodiments.

In accordance with the description set forth above, when the present invention is applied to a power transmission system in which a fluid transmission device such as a torque converter is interposed in its transmission route, drive is transmitted from the engine to the planetary gear means either directly or in a manner bypassing the fluid transmission system or with an overdrive gear ratio that is attained by the operation of the overdrive unit 40 operating to reduce fuel costs due to slippage and fuel losses which may be caused in the fluid transmission system. Moreover, since the overdrive unit 40, or the unit 40', is provided and arranged at the input side of the speed change gear unit 50, and since it is not affected by the variable outputs resulting from the different drive ratios achieved by the gear unit, the mechanical strength of the overdrive gears is not reduced. Additionally, the clutch device 30, or the clutch device 30', and the overdrive unit 40 or the overdrive unit 40', have certain component parts thereof in common and thus these devices may be reduced in size. It is to be noted that the invention may be applied in cases where the speed change gear unit 50 delivers four or more speed ratios and where the control for the gear unit is performed manually without resorting to clutch devices 52,53 and braking bands 62,63.

While specific embodiments of the invention have been shown and described in detail to illustrate the application of the inventive principles, it will be understood that the invention may be embodied otherwise without departing from such principles.

What is claimed is:

1. A power transmission system for a vehicle including an engine and a drive member for delivering power from said engine, said system comprising a fluid transmission system including an impeller and a turbine, means connecting said drive member to said impeller, a speed change gear unit including an input shaft, first clutch means operative to connect said turbine to said input shaft of said speed change gear unit, second clutch means for bypassing said fluid transmission system operative to connect said drive member with said input shaft of said speed change gear unit, and an overdrive unit including frictional coupling means mounted intermediate said engine drive member and said input shaft of said speed change gear unit, said overdrive unit being adapted to provide overdrive operation when said fluid transmission system is bypassed by operation of said second clutch means, said input shaft of said speed change gear unit being coupled to an intermediate shaft to receive power therefrom, said overdrive unit including a sun gear, pins affixed to said engine drive member, pinion means rotatably mounted about said pins, a hub member fixed to said intermediate shaft and having formed thereon a ring gear, said ring gear being arranged for intermeshing engagement with said pinion means, and a braking band for locking said sun gear against rotation, said pins being thereupon operative to transmit power to said intermediate shaft through said pinion means, said ring gear and said hub.

2. A system according to claim 1 including an intermediate shaft arranged to transmit power to said input shaft of said speed change gear unit, wherein said second clutch means are operative to interconnect said engine drive member with said intermediate shaft, said second clutch means comprising a pressure chamber defined by said engine drive member and adapted to have hydraulic pressure introduced therein, a piston operatively mounted within said pressure chamber for movement in response to hydraulic pressure in said chamber, a spring engaging said piston to apply thereto a force acting against the force of said hydraulic pressure within said pressure chamber, a clutch plate splinedly engaged with said engine drive member, a hub member fixedly connected to said intermediate shaft, a pressure plate, a clutch plate, a clutch disc extending between said clutch plate and said pressure plate to be frictionally engaged therebetween, said clutch disc extending from said frictional engagement into splined engagement with said hub member, said piston being operable by application of said hydraulic pressure within said pressure chamber to move against the force of said spring to frictionally couple said clutch plate with said clutch disc thereby to operatively interconnect said engine drive member with said intermediate shaft.

3. A system according to claim 1 wherein said first clutch means comprises a one-way clutch device connected to transmit power from said turbine to said input shaft through said intermediate shaft, said one-way clutch device being operative to become disengaged when said intermediate shaft rotates at a speed exceeding the speed of rotation of said turbine.

4. A system according to claim 3 wherein said first clutch means further includes an additional clutch mechanism adapted to engage said turbine with said intermediate shaft, said additional clutch mechanism comprising a pressure chamber defined integrally with said turbine and adapted to have hydraulic pressure applied therein, a piston operatively engaged within said pressure chamber and movable in response to hydraulic pressure therein, a pressure plate, a clutch plate splinedly connected with said turbine, a clutch disc arranged to be frictionally engaged between said clutch plate and said pressure plate, said clutch disc extending into splined engagement with said intermediate shaft, a spring mounted to engage said piston against the action of pressure in said pressure chamber, said piston being operative in response to pressure within said pressure chamber to frictionally couple said clutch disc between said pressure plate and said clutch plate, said clutch disc being arranged to operatively interconnect said intermediate shaft with said turbine when said piston is moved to frictionally engage said clutch disc between said pressure plate and said clutch plate.

5. A system according to claim 1 including coupling means connecting said turbine to said input shaft of said speed change gear unit, said overdrive unit including a clutch device for direct drive with said overdrive unit being connected intermediate said engine power shaft and said coupling means.

* * * * *